United States Patent [19]

Bibeau

[11] 4,078,112
[45] Mar. 7, 1978

[54] COATING MODIFICATION PROCESS FOR ULTRAFILTRATION SYSTEMS

[75] Inventor: Alexander Armand Bibeau, Yorktown Heights, N.Y.

[73] Assignee: Union Carbide Corporation, New York, N.Y.

[21] Appl. No.: 704,532

[22] Filed: Jul. 12, 1976

[51] Int. Cl.$^2$ .............................................. B01D 31/00
[52] U.S. Cl. ................................... 427/444; 427/377; 210/23 F; 210/504; 210/506; 210/497 R
[58] Field of Search .............................. 427/377, 444; 210/500 R, 500 M, 504, 506, 23 H, 23 F; 55/DIG. 9, 524; 148/6.27

[56] References Cited

U.S. PATENT DOCUMENTS

| 3,022,187 | 2/1962 | Eyrand et al. | 210/500 M X |
|---|---|---|---|
| 3,871,881 | 3/1975 | Mikelsons | 148/6.27 |

FOREIGN PATENT DOCUMENTS

| 2,422,777 | 11/1974 | Germany | 210/23 F |
|---|---|---|---|

*Primary Examiner*—Ralph S. Kendall
*Attorney, Agent, or Firm*—William Raymond Moran

[57] ABSTRACT

A coating modification process is provided for use in ultrafiltration systems to improve the adherence of porous coatings of preformed, aggregated, inorganic metal oxide particles, to substrates, particularly those comprised of hollow tubular porous carbon members. The process involves exposure of the coated members, during the initial treatment to water vapor at specific humidity, temperature and times. The ultrafiltration systems so treated are particularly well-suited for prolonged use in the concentration and separation of oil from mixtures of oil, water and detergents, the recovery of polyvinylalcohol from textile wastes, and other useful applications.

5 Claims, No Drawings

COATING MODIFICATION PROCESS FOR ULTRAFILTRATION SYSTEMS

This invention relates in general to a coating modification process for ultrafiltration systems. In another aspect, this invention is directed to a process for improving the adherence of porous coatings of preformed, aggregated, inorganic metal oxide particles to substrates. In a further aspect, this invention is directed to an improved coating method which extends the use of ultrafiltration systems by minimizing erosion of the inorganic metal oxide particles contained on the systems substrate.

In recent years a variety of processes have been disclosed in the literature relating to ultrafiltration techniques. A majority of work in the ultrafiltration area was developed at the Oak Ridge National Laboratories of the United States Atomic Energy Commission where extensive studies of ultrafiltration, or cross-flow filtration, as it is sometimes called, have been carried out. The work there was primarily concerned with high pressure (500–950 psi) systems using porous tubular support structures of carbon or alumino-silicates or a microporous membrane on a perforated stainless steel sleeve.

The investigators at Oak Ridge found that for some aqueous systems, a bed of particles uniformly dispersed onto a porous substrate functions as an efficient filter medium which rejects the passage of particles and molecules whose size exceed the openings between adjacent particles in the porous bed. It was suggested that the particles deposited on the substrate surface may be of any material inert to the solutions in contact with the surface. A variety of materials such as diatomaceous earth, perlite, asbestos fibers, cellulose fibers, dried silica gel, and carbon have been used.

In other experiments at Oak Ridge it was shown that colloidal hydrous oxides may be used as permeation barriers for the hyperfiltration in reverse osmosis treatment of solutions, thereby concentrating still lower molecular weight solutes in water, provided that the aqueous solution is pumped over the surface of the permeable membrane under high pressure (50–1000 psi). In this case the colloids are formed from polyvalent metal salts by heating an aqueous solution of the salt until a turbid solution is obtained. To form the membrane, small concentrations of the turbid solution (greater than 10 ppm) are circulated over the support structure at moderate velocity and at pressure. This procedure results in the formation of a thin boundary layer (thickness up to 0.05 millimeters) which serves as an interface between the waste solution and the porous substrate. (See, for example, U.S. Pat. Nos. 3,413,219; 3,449,245; and 3,537,988).

It is indicated in U.S. Pat. No. 3,413,219 at column 2, lines 43 et seq., that membranes formed from the colloidal hydrous oxides will continue to have rejecting properties for a day or more, though rejection gradually decreases. However, it is indicated that the continued presence of an additive in the solution will improve the rejection properties and repair defects which might occur in the membrane. In addition to the necessity for the continued presence of an additive to maintain the desired properties, it has also been found that many of the prior art methods are useful only for the treatment of certain types of liquids.

More recently, as disclosed in U.S. Pat. application Ser. No. 358,943 "Ultrafiltration Apparatus and Process For The Treatmemt of Liquids" filed May 10, 1973 by O. C. Trulson et al., and assigned to the same assignee as this invention, now abandoned, there is disclosed a novel ultrafiltration apparatus and a process for the treatment of liquids. The apparatus as disclosed therein is comprised of:

(a) at least one module having:
  (i) at least one entrance port,
  (ii) at least one exit port,
  (iii) a permeate collection zone having at least one exit port
  (iv) a multiplicity of axially aligned hollow tubular members disposed in the zone in close proximity to one another, the members having a pore volume of at least about 0.08 cc/gm in the distribution peak in the pore diameter range wherein the majority of the pores are from about 0.1 to about 2.0 microns in diameter, the members being supported and sealably mounted in the zone so that fluid entering the module must contact the members and any components of the fluid which permeate the walls of the members collect in the permeate zone, and
  (v) contained on one selected surface of the members a substantially uniform, continuous, adherent porous coating of preformed, aggregated metal oxide particles having an average mean size of less than about 5.0 microns, and a coating of from about 0.01 to about 10.0 microns in thickness without substantial penetration into the members of more than about 5.0 micron.
(b) means for supplying a feed liquid to the module,
(c) means for withdrawing a concentrated liquid from the module, and
(d) means for withdrawing a permeate liquid from the permeate collection zone.

As indicated on page 43 of this copending application, Ser. No. 358,943 the tubular members and the metal oxide coating can be cleaned and sterilized with steam to return the performance to a high level. However, for many applications, such as the recovery and concentration of polyvinyl alcohol, it has been observed that the metal oxide coating tends to erode from the porous tubular members. It is believed that the washing of the tubular members with caustic and peroxide to remove residual organic material deposited during the separation process also results in loss of a certain amount of the coating itself. Hence, the steam treatment as disclosed in the copending application will undoubtedly improve the performance if the pores become clogged, but of course, does not replace lost metal oxide.

In contrast, the process of the present invention employs a water vapor treatment after the coating is applied and before the apparatus is used for the separation and concentration of components contained in liquids and improves the adhesion of the metal oxide coating to its substrate. Accordingly, subsequent washing and cleansing of the tubular members does not result in any substantial erosion of the metal oxide coating.

Accordingly, one or more of the following objects will be achieved by the practice of this invention. It is an object of this invention to provide a coating modification process for ultrafiltration systems which systems are useful for the separation and concentration of components contained in liquids. Another object of this invention is to provide a process for improving the adherence of the inorganic coating to the tubular members which comprise the ultrafiltration module. A further object is to provide a coating of zirconia which is firmly bonded to the porous tubular support and exhibits exceptional resistance to erosion. These and other objects will readily become apparent to those skilled in the art in the light of the teachings herein set forth.

In its broad aspect, the present invention is directed to a process for stabilizing metal oxide coatings on their substrates, particularly the tubular members which comprise the modules of ultrafiltration systems as set forth in copending application, Ser. No. 358,943. The process of this invention comprises the steps of:

(1) contacting the metal oxide coated substrate while still in the wet state and prior to its use for separating and concentrating components contained in liquids, with water vapor at a humidity of at least about 50 percent and a temperature of at least about 80° C. for a period of time to stabilize the metal oxide coating from any substantial erosion.

In practice it has been found that the process of this invention greatly enhances the stability of the metal oxide coating from erosion due to repeated use of the ultrafiltration systems under conditions wherein corrosive liquids and/or high temperatures may be employed.

As indicated above, the treatment of the coated substrates is accomplished while the metal oxide coating is still in the wet state. In general, the treatment employs water vapor, such as steam at an atmosphere of a relatively high humidity, preferably in excess of fifty percent. Temperatures of at least about 80° C. can be employed and preferably those in excess of 100° C. At temperatures of about 130° C. the stabilization process can be completed in a relatively short time, that is, about five minutes or less. It has been observed that the metal oxide should be exposed to the water vapor treatment for at least 1 minute to obtain the desired stabilization.

The process of this invention has been found to be effective in stabilizing a wide range of metal oxide particles. For example, metal oxide particles, such as zirconia of from about 0.1 to about 1.0 microns in size can effectively be stabilized on substrates in accordance with the teachings of this invention. Additionally, the presence of other additives such as silica, hydrous zirconia and the like can equally as well be employed as components of the coated substrates.

The following examples illustrate the best mode presently contemplated for conducting this invention:

EXAMPLE 1

A comparative test was carried out to establish the efficacy of this invention. A group of porous carbon tubes were coated concurrently with 2 mg/cm$^2$ of precursor $ZrO_2$ particles, sized in the 0.1 to 1.0 micron range by centrifuging. The coating was carried out by adding the $ZrO_2$ to 100 liters of acidified water and circulating the water through the interior of the tubes at 100 psi until the turbidity of the circulating water caused by undeposited $ZrO_2$ particles was essentially removed, the water permeating through the tube wall being returned to the circulating feed. One of these tubes was then inserted in a circulation system into which a 0.5% oxalic acid solution was fed at 100 psi and 80° F through the tube at a linear flow velocity of about 20ft/sec. After about 1 hour the turbidity of the circulating liquid was found to be very high, indicating resuspension of the $ZrO_2$ coating particles. Another tube was inserted into a fixture by which steam at a pressure of 30 psi was fed into the tube for 10 minutes, with condensate being bled off. This tube when then treated as the first tube showed much less (factor of greater than 200) coating resuspension, thus showing the efficacy of the steam in preventing coating resuspension.

EXAMPLE 2 - 4

To illustrate the applicability of the process of this invention to other useful coatings several comparative experiments similar to that in Example 1 were carried out. These experiments in particular evaluated the efficacy of this process on coatings which are comprised of two or more components. The coating procedure used was identical with that in Example 1 with the second (and third) component being introduced after the first (or second) component was deposited, neurilization being carried out after all components were deposited. The first multi-component coating (A) was formed by first depositing 1.6 mg/cm$^2$ of precusor $ZrO_2$ particles, sized in the 0.1 to 1.0 micron range by centrifuging, followed by depositing 0.4 mg/cm$^2$ of percursor $ZrO_2$ particles, sized at less than 0.1 micron by centrifuging. The second multi-component coating (B) was formed by first depositing 2mg/cm$^2$ precursor $ZrO_2$ particles which had not been sized, followed by depositing .05mg/cm$^2$ of a hydrous zirconium oxide. The hydrous zirconium oxide was prepared by boiling a 0.2M $ZrOC_{12}$ solution for 5 hrs. to hydrolyze the oxy-chloride. The third multi-component coating (C) was formed by first depositing 1.6 mg/cm$^2$ of precursor $ZrO_2$, particles sized in the 0.1-1.0 micron range by centrifuging, followed by depositing 0.4 mg/cm$^2$ of precursor $ZrO_2$ particles sized at less than 0.1 M by centrifuging and finally followed by about 0.2 mg/cm$^2$ of silica particles. For all three types of coating there was very little if any coating resuspension on prolonged (>2 hr.) exposure to the 0.5% oxalic acid washing procedure described in Example 1.

Although the invention has been illustrated by the preceding examples it is not to be construed as being limited to the materials employed therein, but rather, the invention relates to the generic area as hereinbefore disclosed. Various modifications and embodiments can be made without departing from the spirit and scope thereof.

What is claimed is:

1. A process for the stabilization of coatings of metal oxide particles on substrates which coated substrates are useful in ultrafiltration systems for the separation and concentration of components contained in liquids, said metal of said metal oxide being selected from the group consisting of one or more of beryllium, magnesium, calcium, aluminum, titanium, strontium, yttrium, lanthanum, zirconium, hafnium, thorium, iron, manganese and silicon, said process comprised of contacting the metal oxide coated substrate while still in the wet state and prior to its use for separating and concentrating components contained in liquids, with water vapor at a humidity of at least about 50 percent and at a temperature of at least about 80° C for a period of time sufficient to stabilize the metal oxide coating from any substantial erosion when employed for ultrafiltration purposes.

2. The process of claim 1 wherein said metal oxide is zirconia.

3. The process of claim 1 wherein said metal oxide is zirconia having a particle size within the range of from about 0.1 to about 1.0 microns.

4. The process of claim 1 wherein said substrate is comprised of tubular members having average pore diameters of at least 50 percent of which are within the range of from about 0.1 to about 0.50 microns.

5. The process of claim 4 wherein said tubular members are composed of carbon.

* * * * *